(12) United States Patent
Bosch

(10) Patent No.: US 9,882,704 B2
(45) Date of Patent: Jan. 30, 2018

(54) METHOD AND APPARATUS TO ADD NEW SYSTEM FUNCTIONS TO DEPLOYED NETWORK ELEMENT USING SMART TRANSCEIVERS

(71) Applicants: OE Solutions Co. Ltd., Gwangju (KR); AimValley B.V., Hilversum (NL)

(72) Inventor: Willem van den Bosch, Loenen aan de Vecht (NL)

(73) Assignees: OE Solutions Co. Ltd., Gwangju (KR); AimValley B.V., Hilversum (NL)

(*) Notice: Subject to any disclaimer, the term of this patent is extended or adjusted under 35 U.S.C. 154(b) by 3 days.

(21) Appl. No.: 14/874,266

(22) Filed: Oct. 2, 2015

(65) Prior Publication Data
US 2017/0099131 A1  Apr. 6, 2017

(51) Int. Cl.
*H04L 7/00* (2006.01)
*H04L 12/751* (2013.01)
*H04L 12/24* (2006.01)
*H04L 12/26* (2006.01)

(52) U.S. Cl.
CPC .......... *H04L 7/0016* (2013.01); *H04L 41/082* (2013.01); *H04L 41/12* (2013.01); *H04L 45/02* (2013.01); *H04L 43/0811* (2013.01); *H04L 43/106* (2013.01)

(58) Field of Classification Search
CPC ... H04L 63/0272; G06F 21/85; G06F 11/3485
USPC ................................................. 370/392, 389
See application file for complete search history.

(56) References Cited

U.S. PATENT DOCUMENTS

| | | | | |
|---|---|---|---|---|
| 9,043,448 B1* | 5/2015 | Ng | .......... | G06F 15/177 709/220 |
| 2015/0311997 A1* | 10/2015 | Boyd | .......... | H04Q 11/0067 398/68 |
| 2016/0020948 A1* | 1/2016 | Janz | .......... | H04L 41/0809 370/255 |
| 2016/0028488 A1* | 1/2016 | Yu | .......... | H04J 3/0667 398/135 |

OTHER PUBLICATIONS

Bosch, Willem van den, "Add T-TC to equipment and verify behaviorwith PDV test-cases", International Telecom Syn Forum (ITSF), Budapest, Hungary, Nov. 4-6, 2014.

* cited by examiner

*Primary Examiner* — Charles C Jiang
*Assistant Examiner* — Will Lin
(74) *Attorney, Agent, or Firm* — Arent Fox LLP

(57) ABSTRACT

Disclosed are apparatuses and methods in data communications for adding new system functions to an existing network element without having to provide software or hardware updates to the existing network element. For example, an apparatus for data communication is configured to include a switching unit, a plurality of interfaces coupled to the switching unit, and a plurality of smart transceivers. The plurality of smart transceivers each comprises a discovery unit and a new system function unit. The discovery unit is configured to discover other smart transceivers coupled to the plurality of interfaces and the new system function unit is configured to add one or more new functionalities to the apparatus without adding software or hardware updates to the apparatus.

23 Claims, 13 Drawing Sheets

METHOD AND APPARATUS TO ADD NEW SYSTEM FUNCTIONS TO DEPLOYED NETWORK ELEMENT USING SMART TRANSCEIVERS

TECHNICAL FIELD

The present disclosure relates to adding new system functions to an existing network element without changing or updating hardware or software of the existing network, and in particular, for example, adding the new system functions to the existing network element using smart transceivers coupled to the existing network element.

BACKGROUND

In data communications networks, switches and routers are common building blocks. The switches and routers are typically both store-and-forward devices. The switches are used to create a network and generally are used as controlling devices to connect various computing devices, including computers, servers, or other devices, such as within a building or campus. Through use of the switches, networked devices are enabled to communicate with each other. Also, the routers are networking devices configured to connect two or more networks, and also to forward data packets along the networks. In packet-switched networks, the routers are configured to link various devices to the Internet, selecting the best path for packet data to travel over the Internet.

In telecommunication networks, including long term evolution (LTE) base stations, numerous switches and routers are used together with base stations. LTE base stations are frequency synchronized but are bandwidth limited because the LTE base stations are designed to support a frequency division duplexing (FDD) mode. The bandwidth of the LTE base stations may be significantly increased by switching to a time division duplexing (TDD) mode from the FDD mode. The TDD mode requires, however, time and phase synchronization such that the radio interface of each LTE base station is time-of-day (ToD) synchronized with +/−1.5 microsecond (ms) of each other (e.g., other LTE base stations). As such, to support and meet ever increasingly high bandwidth requirements, the existing packet networks that support frequency synchronization need to be transformed into packet networks that can support time and phase synchronization. In other words, the existing packet-based networks need to be upgraded or changed to support either a boundary clock (BC) or a transparent clock (TC) for the synchronization. However, many existing packet networks do not support the boundary clock and/or the transparent clock because many of the deployed switches or routers in the existing packet networks are not equipped with such new or enhanced system functionalities.

For example, about 80% of the currently deployed systems in telecommunications networks do not support system functionalities such as time synchronization, including IEEE1588 Transparent Clock (TC) or Synchronous Ethernet (Sync-E). Upgrading the currently deployed systems in the field for such new system functionalities may be costly and sometimes require expensive re-designs of interface cards or system cards, and/or require hardware and/or software updates. Further, sometimes it may not be possible to change the already deployed systems. To add such new system functionalities to currently deployed equipment, there are generally two possible options: (a) replacing the already deployed system with other new equipment, or (b) wiring up additional boxes or devices next to the deployed system to add new system functionalities.

Thus, there is a need for methodologies and/or technologies that are cost effective as well as technically efficient to add new system functionalities to already deployed systems without replacing the deployed systems, without using additional boxes or devices, and without performing significant updates to hardware or software components of the deployments.

SUMMARY

In accordance with the present disclosure, disclosed herein are apparatuses and methods for adding new system functionality to an existing system in a network without modifying software or hardware of the existing system. The existing system may include a network element such as a network switch, a bridge, or a router that includes one or more interface transceivers. In an aspect of the present disclosure, the new system functionalities may be added by exchanging interface transceivers with smart transceivers. The smart transceivers may be coupled to the network element and be configured so as to enable a discovery process to identify other smart transceivers coupled to the network element, via normal data traffic paths. After performing the discovery process, the smart transceivers may communicate with each other to add new, virtual system functionalities to the existing system, without having to make any software or hardware updates. By way of example, with these apparatuses and methods, new system functionalities such as a transparent clock function, synchronous Ethernet, or other functionalities may be added to an existing network element, without any software or hardware updates, by virtue of replacement of the existing interface transceivers with the smart transceivers.

According to an example implementation in accordance with an aspect of the present disclosure, an apparatus for data communication may include a switching unit, a plurality of interfaces coupled to the switching unit, and a plurality of smart transceivers coupled to the plurality of interfaces. Also, each of the plurality of smart transceivers may comprise a discovery unit and a new system function unit. The discovery unit may be configured to discover other smart transceivers coupled to the plurality of interfaces. The new system function unit may be configured to add one or more new systems functions to the apparatus.

In another aspect of the present disclosure, each of the smart transceivers may be configured to communicate with other smart transceivers coupled to the plurality of interfaces such as via a virtual connection through the switching unit of the apparatus. The virtual connection may comprise an Ethernet virtual connection (EVC), a virtual local area network (VLAN), a multiprotocol label switching (MPLS) tunnel and/or an Ethernet connection.

In another aspect of the present disclosure, each of the smart transceivers may comprise a smart small form-factor pluggable (SFP), SFP+, XFP, X2, or XENPAK module, for example. Further, the smart SFP module may comprise a smart optical transceiver including at least one of: a field programmable gate array (FPGA), a micro-controller, and/or a microprocessor.

In another aspect of the present disclosure, the discovery unit of the smart transceiver may be further configured to transmit a discovery message, including a destination address (e.g., MAC address), operational time information (e.g., upTime), and an operating state (e.g., Operation State) of the smart transceiver. Also, the discovery unit may be further configured to receive, responsive to the discovery message, a reply message from another smart transceiver, the reply message being configured to include a source address, up time information, and an operating state of the other smart transceiver.

In another aspect of the present disclosure, the new system function unit of the smart transceiver may be configured to establish a common time-of-day (ToD) among the plurality of smart transceivers coupled to the network element. In such a case, the new system function unit of the smart transceiver may be further configured to send a time-of-day synchronization message, as an initiating transceiver (or local transparent clock (TC)), and configured to receive a reply message, including timestamps, in response to the time-of-day synchronization message. The timestamps may comprise a first transmit timestamp at the local TC (TS1), a second receive timestamp at a master TC (TS2), a third transmit timestamp at the master (TS3), and a fourth receive timestamp at the local TC (TS4), for example. Further, the time-of-day synchronization messages may be sent a predetermined number of times per second.

In another aspect of the present disclosure, the new system function unit of the smart transceiver may be further configured to add Synchronous Ethernet (Sync-E) to a network element that does not support Sync-E.

In another aspect of the present disclosure, the apparatus may comprise a network switch or a router which does not support Sync-E. The network switch or the router may also be configured to have one frequency that transmits all Ethernet physical layer signals.

These and other aspects of the present disclosure will become more fully understood upon a review of the detailed description, which follows.

BRIEF DESCRIPTION OF THE DRAWINGS

A more detailed understanding may be obtained from the following description in conjunction with the accompanying drawings.

DETAILED DESCRIPTION

Figure 1:
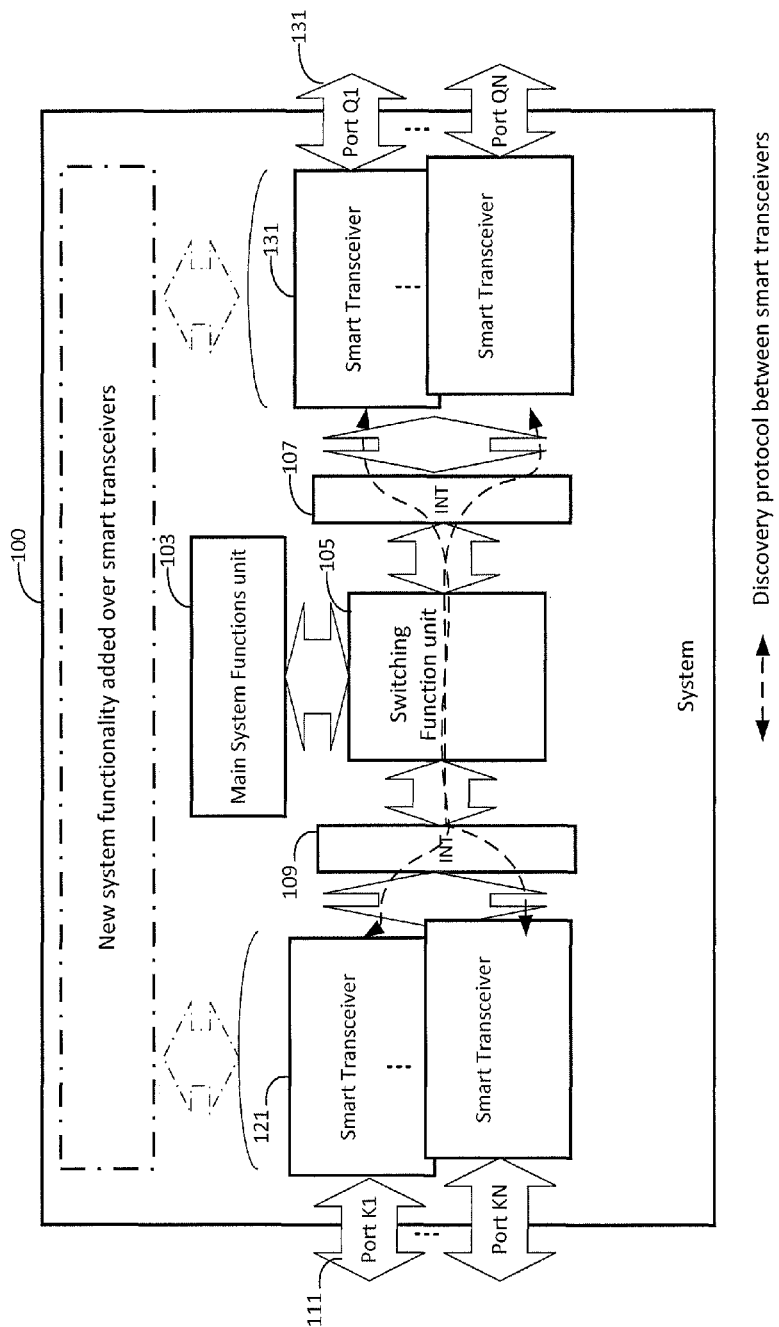
FIG. 1 is a block diagram representatively illustrating an example embodiment of a network element in accordance with an aspect of the present disclosure.

The detailed description of illustrative examples will now be set forth below in connection with the various drawings. The description below is intended to be provided as an example only and in no way limit the scope of the claimed invention. The description provides a detailed example of possible implementations, and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts.

The present disclosure provides descriptions of how to add new system functions to an existing network element, without the necessity of modifying hardware or software, by virtue of use of one or more smart transceivers. By way of example, in accordance with the present disclosure, a new system function such as a transparent clock (or sync-E) may be added to an existing network element (e.g., a network switch or a router) without modifying hardware or software, but the scope of the present disclosure may not be interpreted as being limited to the example embodiments of the present disclosure.

In an aspect of the present disclosure, new system functions, such as transparent clocks, may be added to an existing network element, such as a network switch or router, by use of one or more smart transceivers, e.g., smart optical transceivers. The optical transceivers may be responsible for receiving and transmitting optical data from one or more fiber channels and may be provided with a pluggable form factor. Adding the transparent clock functionality to the network element by using the smart transceivers may require, for example, one or more of: (i) determining local time of day (ToD) information available on each port of the network element, time stamping of timing event messages (e.g., precision time protocol (PTP) event messages) at an edge of the network element; (iii) calculation of the "residence time" of PTP event messages through the network element; and/or (iv) capability to update a correction field of a timing packet with the measured "residence time." Implementation of these features may require that each port be time stamped with the "local time." The residence time may be measured by subtracting the receive time from the transmit time, which may be included in the correction field of each message. The term "residence time" used herein may refer to a time that a packet spends passing through a network element, such as a switch or router.

As noted above, the network element, such as the network switch or the router, may be configured to receive and couple to smart transceivers in various form factors, via one or more ports of the network element. In an aspect, the smart transceivers may include smart small form-factor pluggable (SFP) modules or the like and replace the existing transceivers (e.g., regular SFP modules) in the network element. For example, in accordance with an aspect of the present disclosure, a smart SFP module may be configured to synchronize its local time, which may be referred to as a local time of network element (ToNE). The synchronization of the local ToNE may be performed according to a proprietary or industry standard protocol, such as IEEE1588, through the network element.

Further, in one example implementation, a dedicated connection may be provided, such as an Ethernet virtual connection (EVC), a virtual local area network (VLAN), a multi-protocol label switching (MPLS), etc., among the smart SFP modules, for example, plugged into the network element. The term EVC used herein means an association of two or more user network interfaces (UNI), enabling the transfer of Ethernet frames or packets among them. The term MPLS used herein means a scalable, protocol-independent packet forwarding technology that uses labels to make forwarding decision for data packets. The data packets may be assigned labels in a MPLS network, and packet forwarding decisions may be made only on the contents of the labels. MPLS may be used to carry different types of traffic, including Internet protocol (IP) packets, asynchronous transfer mode (ATM), synchronous optical network (SONET), and Ethernet frames.

The synchronization of the local ToNE enables all the smart SFP modules to have the same local ToNE, thereby providing synchronized clock information to other devices. Further, in a smart SFP module, each timing packet (which may be called as an IEEE1588 event packet) may be classified and timestamped and a residence time of the timing packet may be calculated and added to a correction field of the timing packet.

As a result, many benefits and advantages of using methodologies and devices disclosed herein—such as using the smart transceivers (e.g., smart SFP modules) in place of the existing transceivers (e.g., SFP modules)—abound and may include, for example: no need to manage the device (e.g., smart SFP module), ease in plugging the device into a 1 GE SFP cage, support of 1000 Base-X optical interface and adding transparent clock (TC) functionality to the ports of the network element with a correction error of less than +/−50 nanoseconds (=resident time−corrected value), support of bi-directional Synchronous Ethernet (Sync-E) timing, and/or many others. Note that the term Sync-E used herein refers to an industry specification for facilitating the transfer of clock signals over the Ethernet physical layer. Sync-E is designed to provide a synchronization signal to network resources on an Ethernet network, which do not carry clock synchronization information. Further, the smart transceivers may be based on OAM-T hardware, for example, and may include one unicast-MAC address and one common multicast MAC address.

It is known in the related art that transceiver modules may include pluggable, hot-swappable input/output transceivers used in data communication and telecommunications networks. As noted, the pluggable transceiver modules may provide interfacing among communication devices, such as switches, routers and fiber optic cables, and may be configured to perform conversions between optical and electrical signals. The pluggable transceiver modules may be in standardized form factors such as SFP, SFP+, XFP, X2, XENPAK, and many others. The standardized pluggable transceiver modules may enable modularity and field replacement functions, such as hot swapping. Also, the use of standardized form factors may allow an optical pluggable transceivers to be coupled to fiber transmission systems using a compatible port of the network element.

FIG. 1 is a high level block diagram illustrating an example of a system 100 for data communications, in accordance with an aspect of the present disclosure. The system 100 shown in FIG. 1 may be implemented, but not limited to, as a network switch or a router. As such, the system 100 may be configured to include main system functions 103, a switching function unit 105, a plurality of interfaces 107 and 109, a plurality of ports 111 and 131, a plurality of smart transceivers 121 and 131. As illustrated in FIG. 1, the plurality of smart transceivers 121 and 131 are coupled to the plurality of interfaces 107 and 109, such that the smart transceivers communicate with each other via the interfaces 107 and 109, and the switching function 105. The plurality of smart transceivers 121 and 131 are also coupled to the various ports 111 and 131 for signal and/or data reception and transmission purposes.

In an aspect, the system 100 may be implemented as a router or a computer networking device. Thus, multiple ports of the system 100 may be used for device connection and be configured to forward data to one or multiple devices connected to the multiple ports.

When the system 100 is implemented as the network switch or the router, the system 100 may operate at one or more layers of an open systems interconnection (OSI) model. That is, the system 100 may process and forward data at a data link layer (layer 2) or process data at a network layer (layer 3) through its routing functionality, which uses Internet protocol (IP) addresses, for example, to perform packet forwarding, enabling data transfer among different devices on a network. Each networked device connected to the system 100 may be identified using a Media Access Control (MAC) address, such that the flow of data or traffic may be regulated by the system 100. As a result, each of the smart transceivers 121 and 131 coupled to the ports 111 and 131, as shown in FIG. 1, may transfer data to any of the other ones at a time, for example.

Alternatively, as mentioned above, the system 100 may be implemented in the form of a router, which may be configured to forward data packets among different computer networks. Generally, a router is connected to two or more data lines from different networks. That is, when a data packet arrives at one of the data lines of the router, address information in the packet is read by the router to determine the final destination for the packet, and then, using information according to its routing policy, the router may direct the packet to a next network.

Referring back to FIG. 1, the ports 111 (e.g., Ports K1 . . . KN) and 131 (e.g., Ports Q1 . . . QN) of the system 100 may support different types of networks, including Ethernet, Fiber channel, ATM, or the like. For example, the ports 111 and 131 may be configured to include ports of 1000 BASE-X SFP transceivers, ports of Gigabit uplink ports, ports of 10/100 BASE-T cables, ports of Power-over-Ethernet, etc. or any combinations thereof.

Further, the main system functions 103 may be configured to provide various system level functions, such as controlling and monitoring of the switching function 105 or switching fabric and many other functions.

The switching function unit 105, which is shown in a high level block diagram format, may be configured to provide for various switching operations needed to direct data from any of multiple ports 111, 131 to a specific output port that will likely take the data towards its final destination. The switching function unit 105 may be implemented in hardware (e.g., application specific integrated circuits, processors), software, or any combinations thereof. The switching operations may include queuing, making switching decision and output scheduling of data packets, etc. Further, the switching function unit 105 may determine which output port to which to forward an incoming message, based on a physical device or a MAC address that is included in the incoming message. In addition, or alternatively, the switching function unit 105 may be configured to determine which output port to use for forwarding the message to its final destination based on an Internet protocol (IP) address that may be included in the incoming message.

Further, as shown in FIG. 1, in accordance with an aspect of the present disclosure, the smart transceivers 121 and 131 may discover each other using a predefined protocol for discovery, and add new system functionalities to the system 100, which cannot be provided using conventional transceivers. As noted, the smart transceivers 121 and 131 may include smart SFP modules, and provide new system functionalities that are not possible with the existing transceivers, such as related art SFP modules. Thus, the present disclosure may enable addition of new system functionalities to the existing system 100 in a distributed manner over the smart transceivers 121 and 131, without performing hardware and/or software updates of the system 100.

Figure 2:
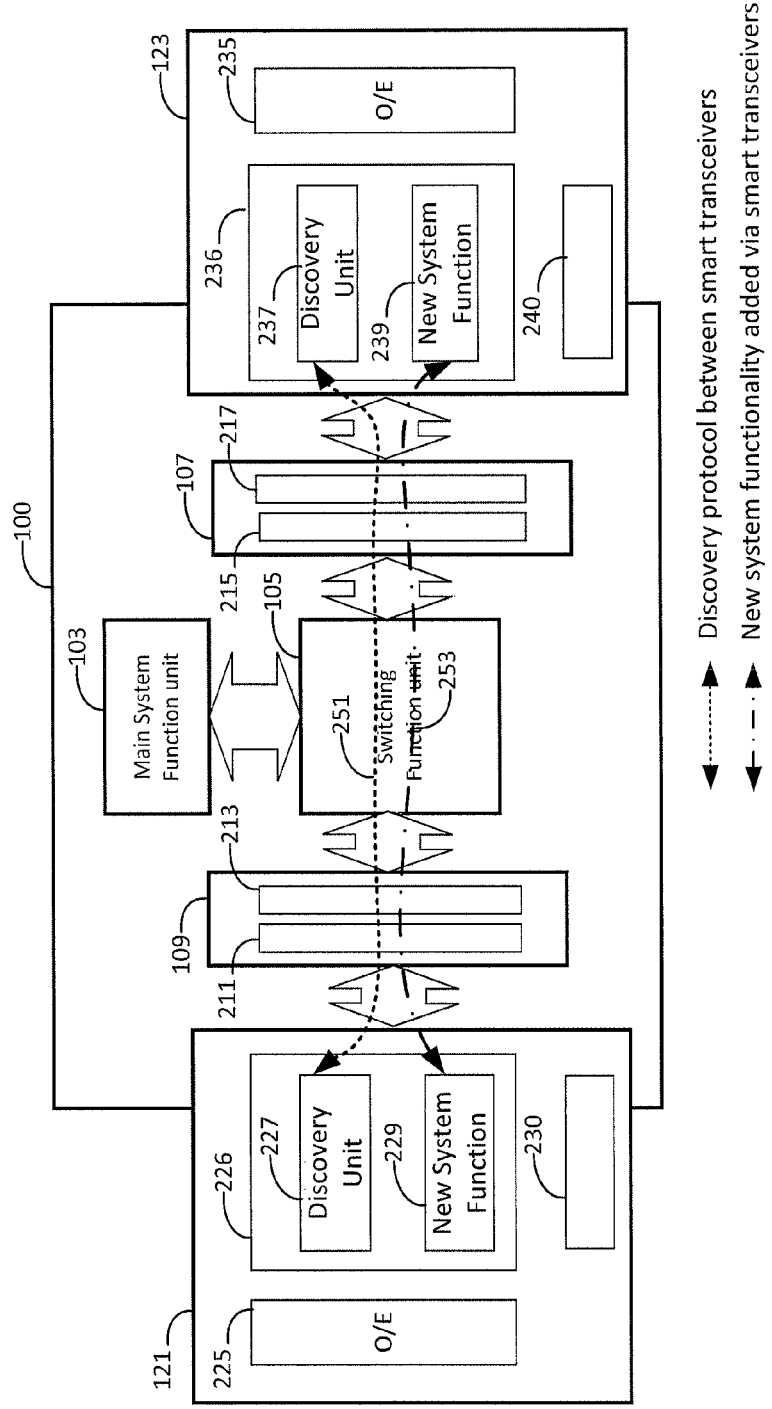
FIG. 2 is a block diagram representatively illustrating an example embodiment of a network element in accordance with another aspect of the present disclosure.

FIG. 2 is a block diagram representatively illustrating an example system in accordance with an aspect of the present disclosure. For the sake of brevity, descriptions of blocks with the same reference numeral as those in FIG. 1 are omitted. In FIG. 2, the system 100 (or a network element) includes various components, such as a main system function device or unit 103, a switching function device or unit 105, interfaces 107 and 109, and smart transceivers 221 and 223 coupled to the interfaces 107 and 109 via corresponding ports (which are not shown in FIG. 2).

In the example of FIG. 2, the interface 107 or 109 is configured to include a physical layer 217 or 211 and a MAC layer 215 or 213. Further, the smart transceiver 121 is configured to include a conversion (O/E) component 225, a new system functionality unit 226, and a storage unit 230. Similarly, the smart transceiver 123 is configured to include a conversion (O/E) component 235, a new system functionality unit 236, and a storage unit 240.

The conversion (O/E) component 225 or 235 is configured to receive an optical signal and convert it into an electrical signal and vice versa (e.g., to receive an electrical signal and convert it into an optical signal), in the course of performing optical transceiver functions. As such, the conversion component 225 or 235 may include optical transceiver components, such as a transmitter optical subassembly (TOSA) and receiver optical subassembly (ROSA), as well as other electronics (which are not shown) that are needed for performing optical transceiver functions. Further, the TOSA may include a light-emitting element that converts an electrical signal into an optical signal. The light-emitting element may include a light-emitting diode, a laser diode, a vertical cavity surface emitting laser, or the like. The ROSA may include a light-detecting element that converts an optical signal into an electrical signal for recovering and processing of data. Also, the smart transceiver 121 or 123 may be configured to include various other components that perform electro-optical interfacing and functions, such as serialization/deserialization (SerDes), framing, inserting data into transmission frames, e.g., Ethernet, SONET, etc.

The new system functionality unit 226 or 236 may include at least a discovery unit 227 or 237 and a new system function 229 or 239. The discovery unit 227 or 237 may be configured to, among other functions, transmit every second, for example, a multicast discovery message to all smart transceivers coupled to interfaces 107 and 109 of the network element. The discovery unit 227 or 237 may be further configured to receive a unicast discovery message in response to the multicast message from each of the smart transceivers that is reached, and to assemble a database or other repository of information regarding the smart transceivers coupled to the interfaces 107 or 109. The new system functionality unit 226 or 236 may be implemented in hardware, software, or any combinations thereof. As noted below, in one implementation, the discovery unit 227 or 237 and/or new system function 229 or 239 may be implemented in logic including at least one of: a field programmable gate array (FPGA), a microcontroller, a microprocessor, application specific integrated circuit (ASIC), a gate array, programmable logic, hardware logic, a processor, a microcontroller, a microprocessor, software, and/or any combinations of thereof.

In an aspect of the present disclosure, for the purpose of an example illustration, it is assumed that a new system functionality such as a transparent clock (TC) function is to be added to a network element using smart transceivers (e.g., smart SFP modules), which replace regular transceivers (e.g., SFP modules). The smart transceivers may also be equipped with hardware, software, or combinations thereof, which are configured to implement the TC function.

In the example of adding the transparent clock function, the discovery unit 227 or 237 of each smart transceiver is configured to determine a master TC among the discovered TCs (e.g., smart SFP modules) coupled to the interfaces 107 and 109. In one implementation, the master TC may be determined based on the medium access control (MAC) addresses of the discovered TCs. For example, the master TC may be selected as the one smart SFP module having the lowest MAC address among the discovered smart SFP modules.

Typically, the TC function may also be provided by virtue of having a time-of-network element (ToNE) synchronization among devices coupled to the network element using the smart transceivers. That is, smart transceivers such as smart SFP modules with TC functions may replace the existing SFP modules coupled to the network element, as such SFP modules do not have the TC functions. A smart transceiver may then be designated as a local TC and be configured to obtain local ToNE information. The local TC may be further configured to transmit multiple synchronization messages in a predetermined time to a smart SFP module which is identified as a master TC. Synchronization messages (e.g., ToNE-Sync messages) may be exchanged in accordance with a predetermined protocol and the local TC may be updated based on the exchange of messages, in accordance with either a proprietary protocol or an industry standard protocol, such as IEEE1588 Precision Time Protocol (PTP), which is incorporated herein by reference.

As noted above, the new system function unit 229 or 239 may also include one or more transparent clock function blocks (not shown) configured to perform one or more of various functions, such as classifying and timestamping PTP timing packets, adding timestamps to the PTP timing packets, calculating a residence time through the network element, updating a correction field, and so forth.

Further, as shown in FIG. 2, the smart transceiver 121 or 123 may include a storage unit 230 or 240 configured to store various parameters and information. The storage unit may include various types of memory devices, including but not limited to, read-only memory (ROM), random access memory (RAM), programmable read only memory (PROM), erasable PROM (EPROM), a flash memory, etc. The storage unit 230 or 240 may also be configured to store other operational parameters relating to the TOSA and ROSA. Further, in an aspect of the present disclosure, the storage unit 230 or 240 may be configured to include a database of information on the smart transceivers coupled to the interfaces of the network element. For example, the database may include information on the following parameters relating to each smart transceiver: multicast destination MAC address (DA-MAC)/master MAC address, upTime, Operation State, etc. The term "upTime" refers to a variable configured to indicate a variable storing information on a time duration, for which the smart transceiver has been powered up and in operation. The term "Operation State" refers to a variable configured to indicate information on whether or not the smart transceiver is active. The term "DA-MAC" refers to a variable configured to store information on a MAC address of a destination device. The term "master MAC address" refers to a variable configured to store information on a MAC address of a master TC.

Furthermore, FIG. 2 also illustrates a representative path 251 for discovering the smart transceivers coupled to the interfaces 107 and 109, which are used by the discovery units 227 and 237. Also shown is a representative path 253 for adding or implementing a new system functionality via new system functions 229 and 239 of the smart transceivers 121 and 123.

As noted above, the discovery units 227 and 237 of the smart transceivers 121 and 123 may each be configured to discover other smart transceivers coupled to the interfaces of the network element, according to an aspect of the present disclosure. Further, each smart transceiver 121 or 123 may include a database or other data repository (e.g., a DCTC database) containing information on the smart transceivers, such as upTime, Operation State, master MAC address, etc. As noted, "upTime" stores information on a time duration for which the smart transceiver has been powered up and in operation and "Operation State" stores information on whether or not the smart transceiver is active. In one example implementation, Operation State may be set to "active" when upTime is greater than 300 seconds, or when upTime is greater than 3 seconds and the number of discovered TCs in a DCTC database is less than 2. Further, "master MAC address" stores information on a MAC address of the master TC. In one aspect, the master MAC address may be set as the lowest MAC address among the MAC addresses of the discovered TCs that are active.

As discussed above, when the smart transceivers are coupled to (e.g., plugged into ports of) a network device, such as to replace conventional transceivers, the smart transceivers may be initially powered up for operation. Upon power-up, the smart transceivers may operate to discover all (or one or more) other smart transceivers coupled to the network element via multicast and unicast messages. In an aspect, for example, the discovery unit 227 may transmit a multicast message (e.g., a discover transparent clock (DCTC) message) to discover the discovery unit 237, according to a predefined message protocol. The discovery unit 227 may be further configured to receive a reply message (e.g., a unicast DCTC reply message) in response to the multicast message, in accordance with the predefined message protocol as shown in FIG. 3.

Figure 3:
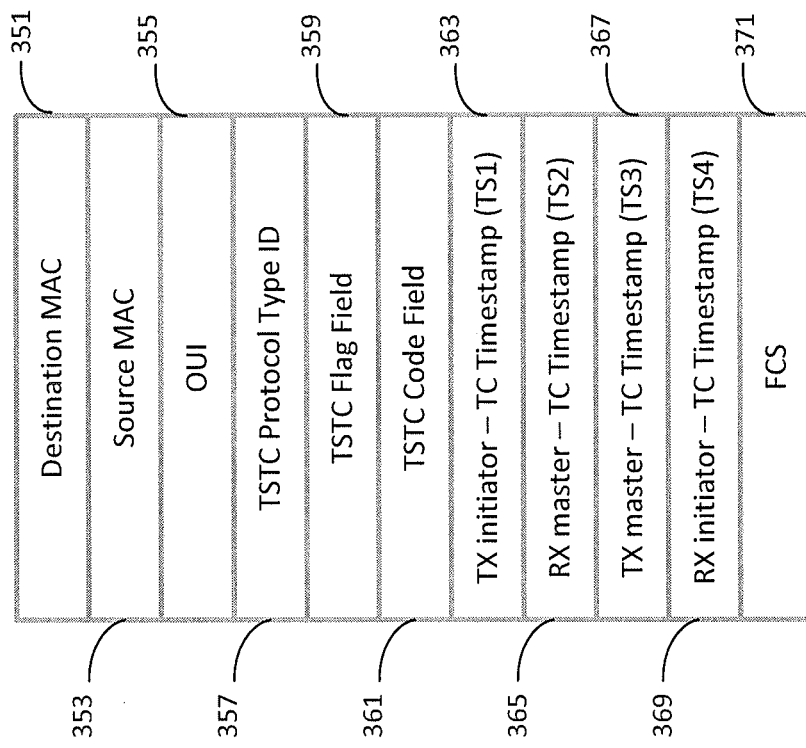
FIG. 3 is a diagram representatively illustrating an example embodiment of a protocol format in accordance with an aspect of the present disclosure.

FIG. 3 illustrates an example of a message protocol or format for communications among the smart transceivers coupled to the network element. By way of example, FIG. 3 illustrates a message format for a synchronization message, e.g., a TSTC message, for the purpose of the following discussion example. An example message format may include, but not be limited to, various information fields, such as a destination address (e.g., destination MAC 351), a source address (e.g., source MAC 353), optical user interface (OUI) 355, protocol type information (e.g., TSTC Protocol Type ID 357), a flag (e.g., TSTC Flag Field 359), a code field (e.g., TSTC Code Field 361), a timestamp of sending a synchronization request message or packet at a local device (e.g., TX initiator—TC Timestamp (TS1) 363), a timestamp of receiving the synchronization request message or packet at a master device (e.g., RX master—TC Timestamp (TS2) 365), a timestamp of sending a synchronization reply message at the master device (e.g., TX master—TC Timestamp (TS3) 367), a timestamp of receiving the synchronization reply message at the local device (e.g., RX initiator—TC Timestamp (TS4) 369), and/or frame check sequence (FCS) information (e.g., FCS 371). In an aspect of the present disclosure, it is noted that the synchronization reply message in accordance with various aspects of the present disclosure may be configured to include all the timestamps, e.g., T1, T1, T3, and T4, as part of the reply message, while the specification such as IEEE1588 may not specify to include all of the timestamps. As such, the synchronization reply message, including all the timestamp information (e.g., T1, T2, T3, and T4), may enable more accurate synchronization of time by the local TC based on computed delay times, upon receiving the synchronization reply message from the master TC.

Figure 4A:
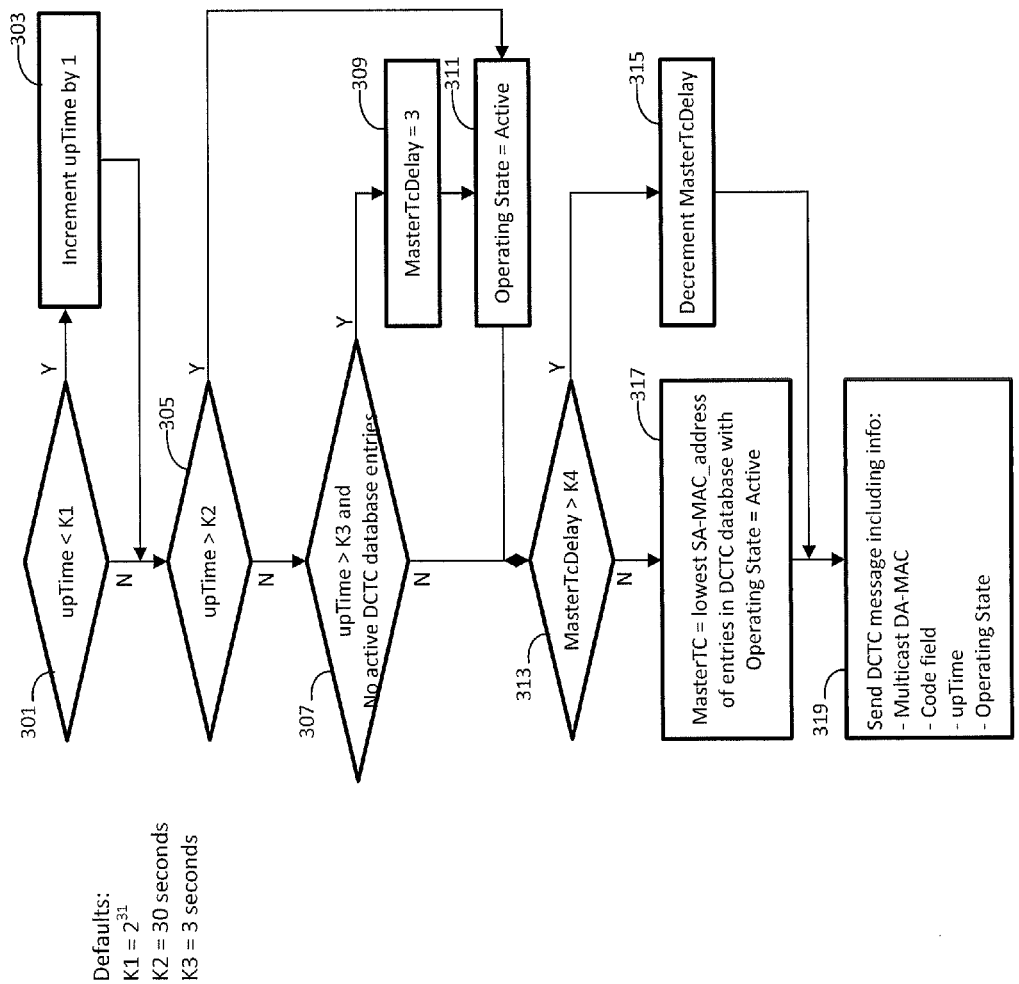
FIGS. 4A and 4B are flow diagrams representatively illustrating an example process employed by a smart transceiver in accordance with an aspect of the present disclosure.
Figure 4B:
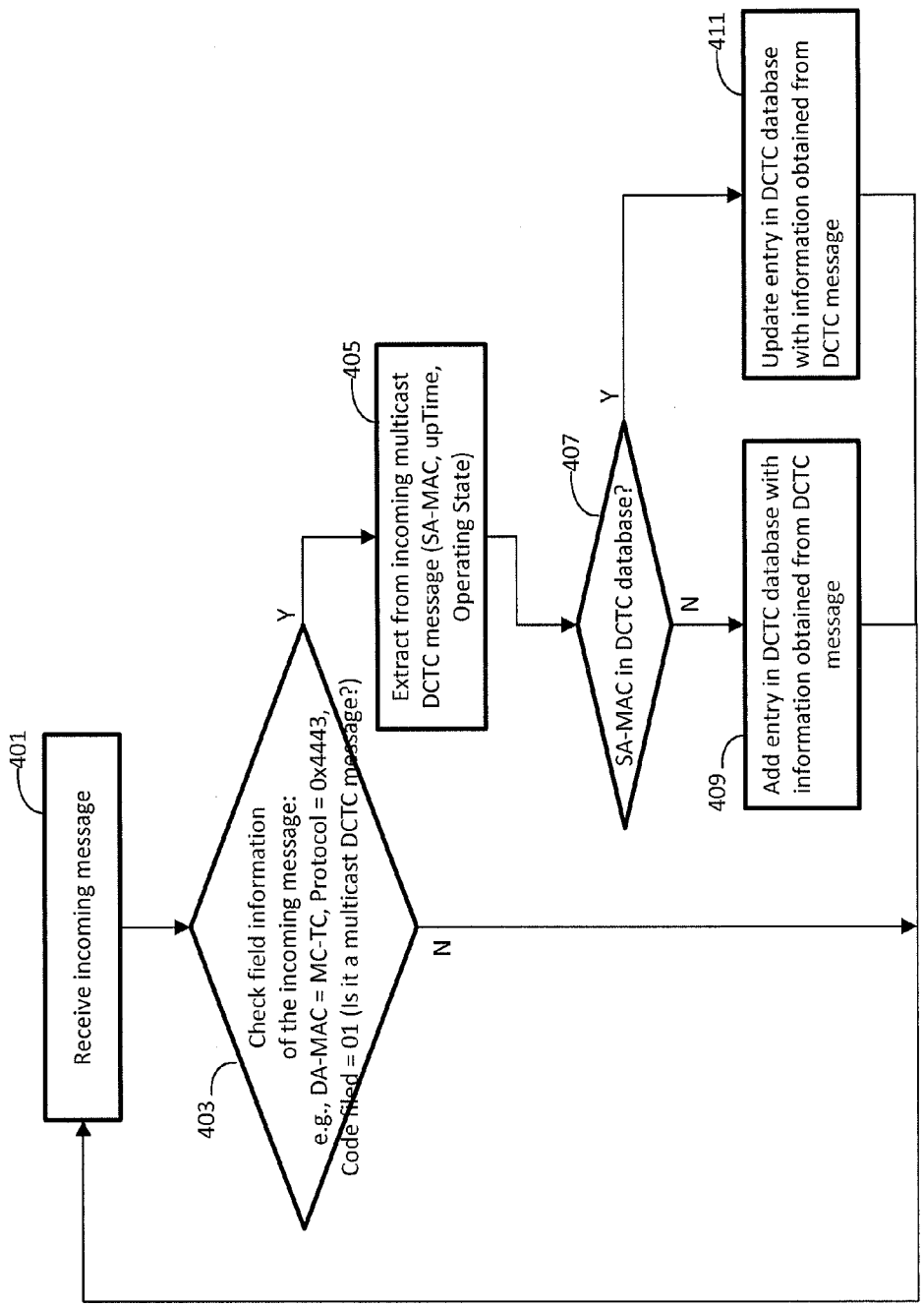

FIGS. 4A and 4B are examples of process flows for discovering and building a database or other data repository on smart transceivers coupled to the network element in accordance with aspects of the present disclosure. By way of example, after power-up, the smart transceiver 121 with capability to provision transparent clock functionality may discover other smart transceiver 123 coupled to the network element, by exchanging messages according to a message format shown in FIG. 3. In FIG. 4A, at steps 301 and 302, after the power-up, the smart transceiver 121 may increment an up-time counter, e.g., upTime, by one every second. If the up-time counter reaches a predetermined value, e.g., K2 (which is initially set to 300 seconds), then the Operation State of the smart transceiver may be set to "active." Alternatively, when the up-time counter is greater than K3 (which is initially set to 3 seconds), but less than K2 (which is initially set to 1 seconds), then it may be determined that there is no active entry in the DCTC database, the master TC delay variable may be set to three (3) seconds, e.g., MasterTcDelay=3, and the Operation State may be set to "active." At 313, if MasterTcDelay is greater than or equal to K4 (e.g., K4 set to one second), then MasterTcDelay may be decremented by one, at 315. However, at 317, if MasterTcDelay is equal to zero, then the master TC may be determined to be the one having the lowest MAC address of the entries in the database with Operation State set to "active." At 319, the smart transceiver 121 (which is not the master TC) then may prepare and multicast a DCTC message with the following parameters, for example: multicast destination MAC address (DA-MAC), code field, upTime, and Operation State. A predetermined number of multicast DCTC messages may be transmitted every second.

FIG. 4B illustrates an example of a process for handling one or more multicast DCTC messages at a smart transceiver, which messages are sent to discover other smart transceivers with enhanced system capabilities, such as transparent clocks. In FIG. 4B, at 401, a message is received as an incoming message at the smart transceiver (e.g., smart transceiver 123) coupled to the network element. When the incoming message is determined to be a multicast DCTC message (e.g., a DCTC message) based on the information included in the incoming message (e.g., code field=01 and protocol=0x4443), then, at 405, certain information, such as a source MAC address (SA-MAC), upTime, Operation State, or the like may be extracted from the incoming message. At 407, based on the extracted information, it may be determined whether or not the source MAC address (e.g., SA-MAC) is included in its database or other data repository (e.g., DCTC database) of the smart transceiver that receives the incoming message. In this example, a database may be implemented as an internal or external memory device. At 411, when the source MAC address is determined to be one of the entries in the database, the entry is updated with the information received via the DCTC message. Otherwise, at 409, when the source MAC address is not determined to be one of the entries in the database, then the source MAC address, along with other information, such as upTime, Operation State or the like, is added to the database as a new entry.

Steps 405 through 411 as depicted in FIG. 4B may be repeated for every incoming message that is identified as a DCTC message, thereby updating the database with new entries at regular intervals. In this manner, the database may be kept up-to-date and current with the recent status information on various smart transceivers 121 and 123 that are coupled to the interfaces 107 and 109 of the network element.

In an aspect of the present disclosure, some or all entries in the database or other data repository (e.g., the DCTC database) may be checked at regular intervals, e.g., every second, for updates. For example, if it is determined that an entry in the database has not been updated in a certain amount of time, e.g., 3 seconds, then the entry may be removed from the database because a smart transceiver associated with the entry may not be in operational mode due to failure or other reasons.

After discovering and building a database of smart transceivers coupled to the network element, each of the smart transceivers may operate to communicate with other smart transceivers to add one or more new or enhanced system functions to the network element.

Figure 5:
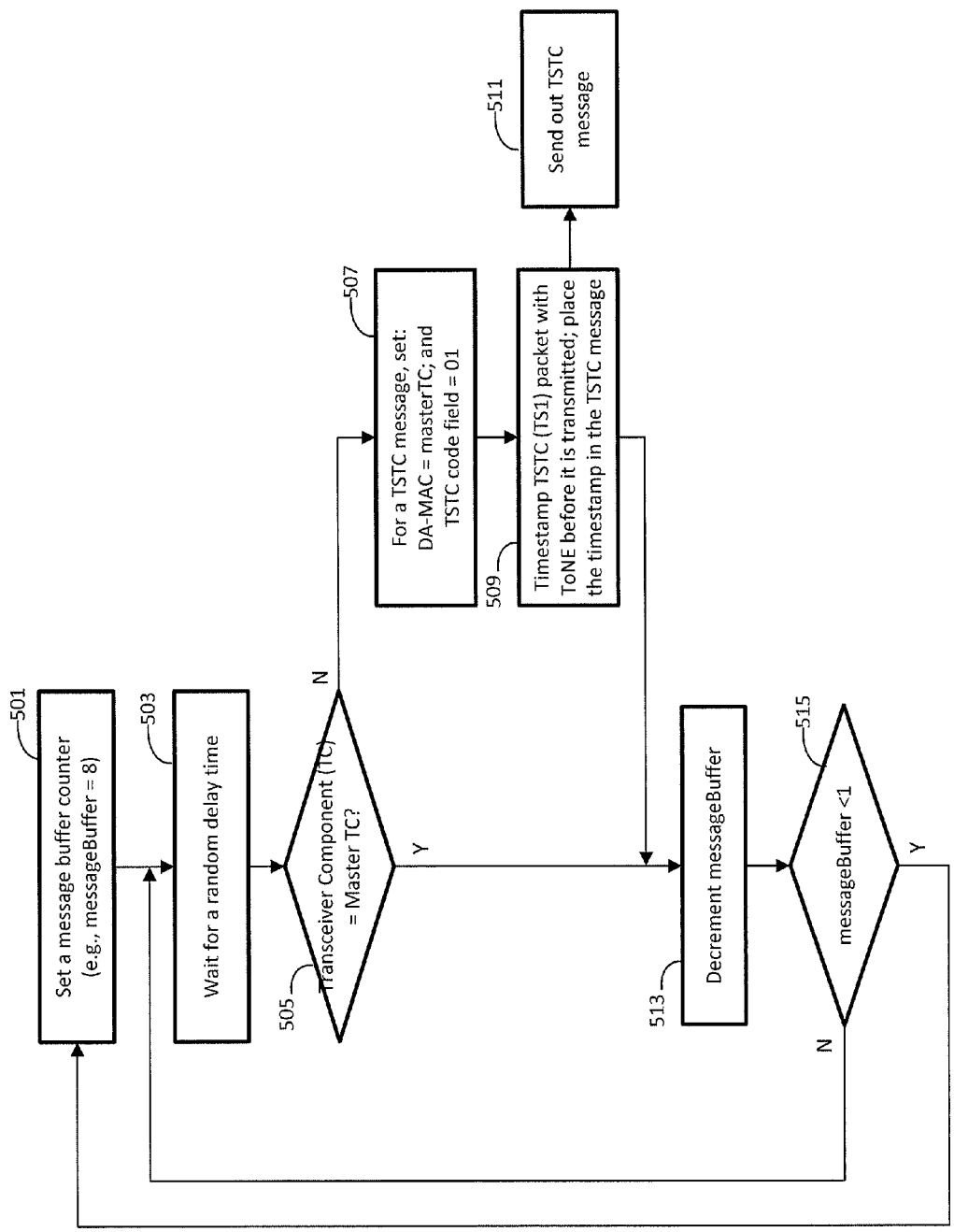
FIG. 5 is a flow diagram representatively illustrating an example embodiment of a process employed by a smart transceiver in accordance with another aspect of the present disclosure.
Figure 6:
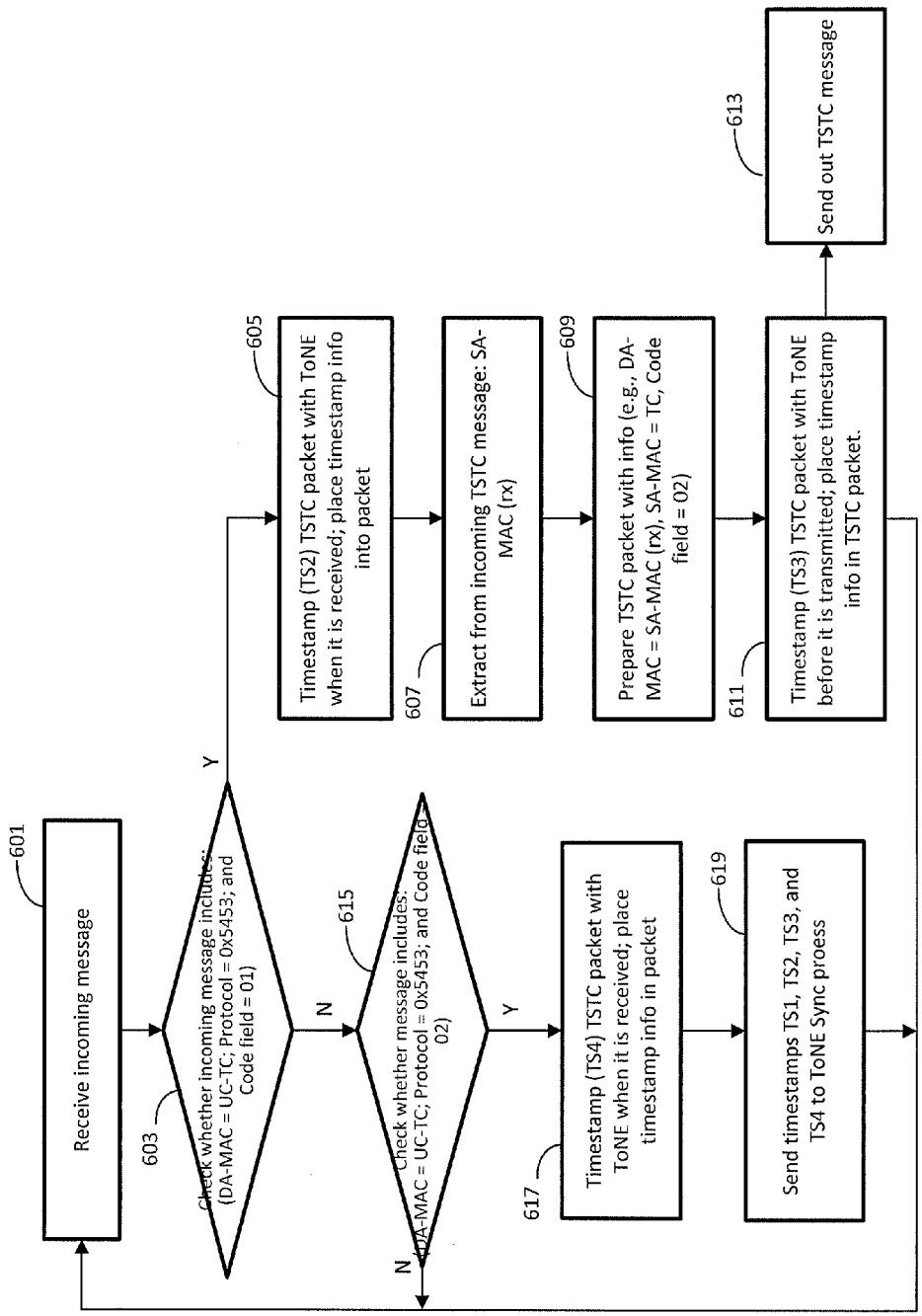
FIG. 6 is a flow diagram representatively illustrating an example embodiment of a process employed by a smart transceiver in accordance with another aspect of the present disclosure.

FIGS. 5 and 6 illustrate examples of flow diagrams for adding a new system function to the network element, in accordance with an aspect of the present disclosure. For example, it is assumed for this example that adding a system function such as synchronization of a time-of-day (ToD) is desired among devices coupled to the network element, but the network element does not support the synchronization of the ToD with conventional devices, including regular SFP modules. In such a case, separate equipment may be added to the network element to provide synchronization of the ToD, or otherwise the network element may need to be replaced with a new network element with hardware or software upgrades, either of which may be very costly and expensive in the existing networks.

However, a new system function in accordance with aspects of the present disclosure—synchronization of the ToD—may be easily added to the existing network element by replacing the existing transceivers with the smart transceivers, thereby providing the existing network element with a new system function, for example, the synchronization of the ToD among the network devices, without the need for performing costly replacements or upgrades.

In the example discussed herein, the synchronization of ToD may be established between the smart transceivers 121 and 123 that are coupled to the interfaces of the system 100 shown in FIG. 2. Each smart transceiver (e.g., smart SFP module) may be configured to include its local time-of-day information. Further, it is noted that a time synchronization similar to Precision Time Protocol (PTP) of IEEE1588, which is incorporated herein by reference, may be implemented using the smart transceivers coupled to the network element (or a system that is not capable of supporting such time synchronization with the existing devices, e.g., conventional transceivers).

IEEE1588 is an industry specification designed to provide a precise time synchronization over a packet based network, e.g., an Ethernet network, such that devices on the Ethernet network are able to have synchronized time. IEEE1588 defines special packets (or a synchronization message or timing packets in the present disclosure) for carrying timing information and specifies a protocol for exchanging those packets among different devices to process various clocks, such as master clocks, slave clocks, boundary clocks and transparent clocks. One methodology in IEEE1588 provides for a slave device to correct for a time offset and time packet delays using a series of message exchanges between master and slave devices. Also, it is noted that the boundary clocks and transparent clocks in IEEE1588 are used to reduce packet delay variation (PDV). PDV may be introduced by packet queuing inside the network element (e.g., the network switch or router), in which data and timing packets are forwarded to the same port. In this manner, the timing packets to be exchanged between the master and slave clocks may be delayed for a variable length of time.

A boundary clock is generally referred to as a switch-clock combination that modifies packets coming into the network element (e.g., a network switch) with timestamps such that the packets exit the network element with the timestamps, which is useful for distributing the timestamping load from a master clock to many other slaves. The boundary clock often relies on an intermediate switch that may be a clock used to transfer the time. Further, a transparent clock (TC) is sometimes referred to as a device that includes a network element (e.g., a network switch) which is able to measure and adjust for packet delays mentioned above. The transparent clock measures queuing delays of individual timing packets inside the network element, such that more accurate time synchronization is achieved between a master clock and a slave clock. As such, the transparent clock determines variable delays as timing packets pass through the network element and this clock accounts for them, thereby making the network element induced delay transparent to slave timing offset calculations. Thus, having transparent clock functionality improves the time synchronization between the master clock and slave clocks, and ensures that the master and slave clocks are not affected by packet delay variations occurring in the network element, because the transparent clock measures a residence time and adds the residence time into a correction field of a timing packet, as further representatively illustrated in FIG. 7A.

FIGS. 5 and 6 illustrate an example process of adding new system functionality, for example, a transparent clock, to a network element in accordance with an aspect of the present disclosure. As noted above, the transparent clock may be added to an existing network element by replacing conventional transceivers with smart transceivers having transparent clock capability. In an aspect of the present disclosure, the smart transceivers may exchange synchronization messages (e.g., TSTC messages) between a first smart transceiver acting as a local TC and a second smart transceiver acting a master TC to synchronize the time-of-day (ToD) information.

FIG. 5, by way of example, illustrates a process used for sending out multiple synchronization messages by a smart transceiver (e.g., a local TC to a master TC). At 501, the local TC (e.g., smart transceiver 121) initiates a process for synchronization of ToD by setting a message buffer counter to a predetermined value, e.g., messageBuffer=8, which means that eight (8) TSTC messages are to be sent to the master TC in one second. At 503, prior to sending the TSTC message, the local TC waits a random delay time period, e.g., a random period of time between 31 ms and 93 ms. After waiting for the random delay time period, at 506 and 507, the local TC (as an initiating TC) operates and prepares a synchronization message, e.g., a TSTC message, including certain information such as a destination MAC address (e.g., DA-MAC) and a code field (e.g., TSTC code field). The destination MAC address may be set to the MAC address of the master TC, and the code field may be set to 01, for example, indicating that the message is a time synchronization request message from a local TC. At 509, before sending out the TSTC message by the local TC, the local TC obtains a first timestamp for the TSTC message, e.g., TS1, and places the timestamp in the TSTC message. Timestamping may be performed at either a physical layer or an upper layer. It is also noted that the timestamping may be performed by, but is not limited to, hardware or interrupt service routine (ISR) at a kernel level or at an application level. In the example described herein, the local TC obtains a time upon which the TSTC message is sent at the physical layer (e.g., TS1) and inserts the timestamp information into the TSTC message. The TSTC message may be identified and detected at or near the physical layer such that the precise sending and reception times may be recorded and used.

At 511, the local TC transmits the TSTC message to the master TC. The TSTC message may include certain information, such as the first timestamp (TS1), protocol field (e.g., protocol=0x5453), and code field (e.g., code field=01). At 513, after the TSTC message is sent out to the master TC, the message buffer counter of the local TC is decremented by one, and the process returns to 503. The above described steps are repeated until all the predetermined number of TSTC messages (e.g., in the example 8 TSTC messages per second) are transmitted to the master TC.

Also, in the case of the master TC (e.g., when the receiving smart transceiver is the master TC), at 505, after waiting for the random specified period of time to pass, the message buffer is decremented by one and repeats the process of waiting for the random period of time and decrementing the message buffer by one (e.g., steps 503, 505, and 513).

FIG. 6 is a flowchart of an example illustrating how the TSTC message is received and handled by the master TC, in accordance with an aspect of the present disclosure. Also, it is noted that for the purposes of discussion, the smart transceiver 121 is assumed to be the local TC, and the smart transceiver 123 is assumed to be the master TC among a plurality of smart transceivers coupled to the network element.

At 601, when an incoming message is determined to be a synchronization request message, e.g., a TSTC message for synchronizing ToD information, by the master TC, at 603, the TSTC message is timestamped (e.g., a second timestamp, TS2) at a time when the TSTC message is received by the master TC. In the example described herein, the master TC obtains a time upon which the TSTC message is received at the physical layer (e.g., TS2) and inserts the timestamp information into the TSTC message.

At 607, from the received TSTC message, the master TC obtains the source MAC address (e.g., SA-MAC (rx)) or the MAC address of the smart transceiver 121. At 609, the master TC prepares a TSTC reply message with certain information including, but not limited to, a destination MAC address, a source MAC address, and a code field. The destination MAC address may be set based on the received source MAC address, the source MAC address may be set based on the MAC address of the master TC, and the code field may be set to indicate that the TSTC message is a synchronization reply message from the master TC, e.g., DA-MAC=SA-MAC (rx), SA-MAC=MAC of TC, and code field=02.

At 611, the master TC obtains a third timestamp, e.g., TS3, and places the timestamp information in the TSTC reply message. At 613, the master TC transmits the TSTC reply message, including timestamps TS1, TS2, and TS3 to the local TC.

At 603 and 615, when the local TC receives the TSTC reply message, the TSTC reply message is time stamped at the local TC (e.g., a fourth timestamp TS4), and the timestamp information is placed in the received TSTC reply message.

At 619, the local TC or a component of the local TC that is responsible for synchronization of time may obtain the timestamps TS1, TS2, TS3, and TS4 included in the TSTC reply message. The local TC or component also determines various delays and updates the time-of-network element (ToNE) information at the local TC. In one example implementation, the local TC/component may be configured to compute delay information, such as a forward delay (FD), a backward delay (BD), a roundtrip delay (RTD), and/or a local time difference (DiffLocalToNE), based on the timestamps, TS1, TS2, TS3, and TS4. The local TC/component may also determine an amount of a correction offset to the ToD information (or local ToNE) at the local TC, as shown in FIG. 7A.

It is noted that, in updating the local time information, various methods such as procedures specified in IEEE1588 or other specifications may be employed. IEEE1588 is a protocol designed to synchronize real time clocks among multiple devices in a distributed system, based on correction of a time difference between the master and slave clocks, which is often referred to as the "offset correction." It is also noted that, although the present disclosure references IEEE1588 in part, various aspects of the present disclosure may be implemented using other methods in accordance with a variety of protocols and/or standards, including variants of IEEE1588, network time protocol (NTP)—RFC 1305, TTP, SERCOS, or the like.

Figure 7A:
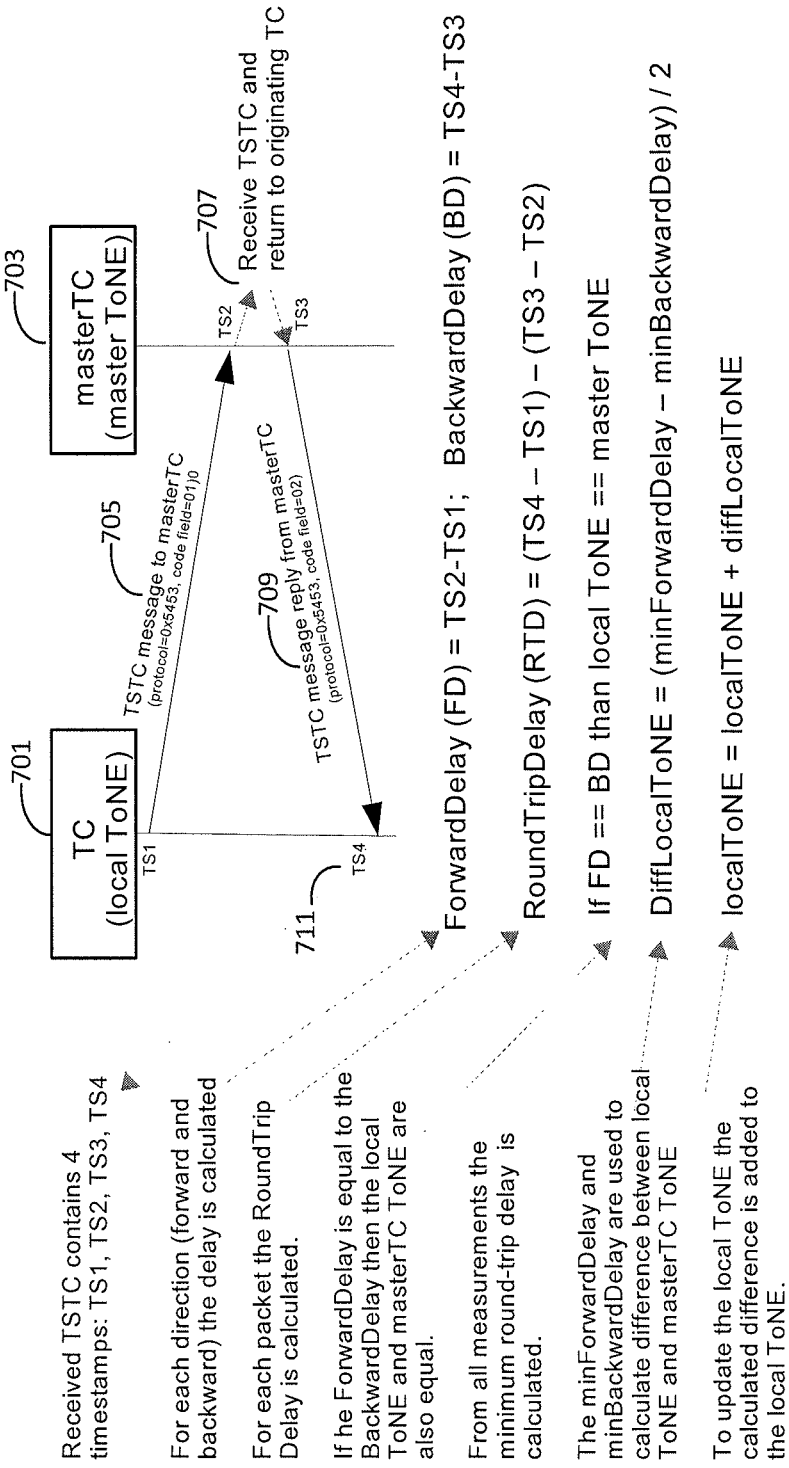
FIG. 7A is a sequence diagram representatively illustrating an example embodiment of a process employed by a smart transceiver in accordance with another aspect of the present disclosure.

FIG. 7A shows an example of a sequence diagram conceptually illustrating how messages are exchanged between a local TC and a master TC in accordance with an aspect of the present disclosure. By way of example, the initiating TC (or local TC) 701 with local ToNE information, e.g., TS1, prepares and sends out a message or a synchronization request message e.g., protocol=0x5453 and code field=01, to the master TC 703. TS1 is referred to in this example as the sending time at the local TC 701. Also, it is noted that the terms "message," "a synchronization request message," "a synchronization reply message," and "timing packet(s)" or "packet(s)" are interchangeably used to mean one or more messages being exchanged between a local TC and a master TC as used herein. At 707, when the TSTC message is received, the master TC 703 with master ToNE timestamps the received TSTC message at a reception time of the TSTC message, TS2. Then, the master TC 703 also timestamps a TSTC reply message 709, e.g., TS3, and inserts the timestamp T3 in the TSTC reply message, before sending out the TSTC reply message 709 to the local TC 701. The TSTC reply message 709 may be configured to include certain information to indicate that the message is a TSTC reply message, e.g., protocol=0x5453 and code field=02. At 711, when the local TC 701 receives the TSTC reply message 709, the local TC 701 again timestamps the TSTC reply message 709 at a reception time of the TSTC reply message, e.g., TS4, and inserts the timestamp TS4 into the TSTC reply message for further processing.

Figure 7B:
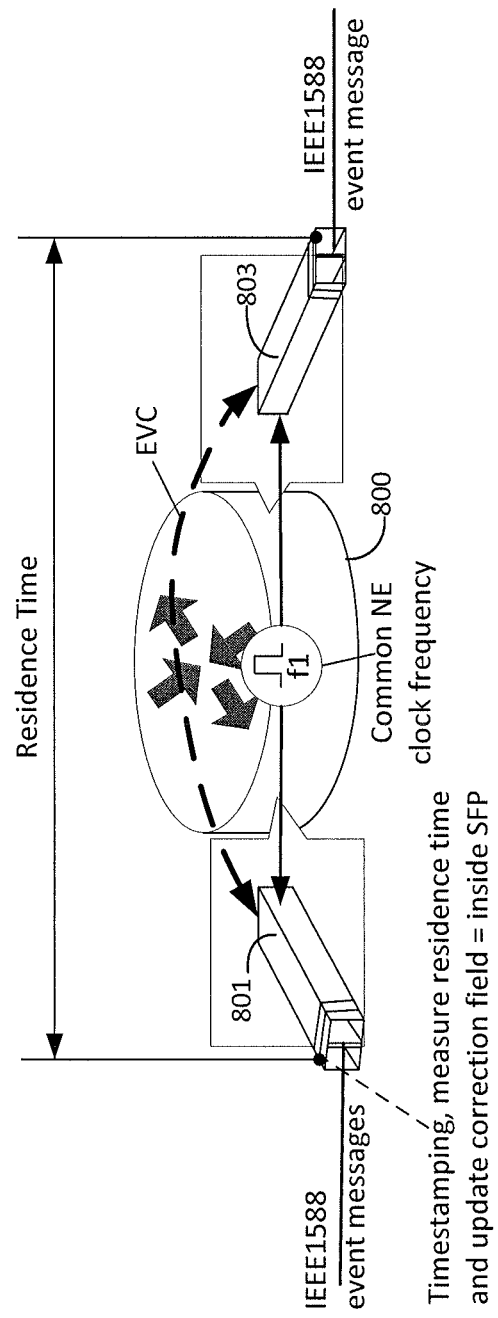
FIG. 7B is a diagram representatively illustrating an example embodiment of smart transceivers used with a network element in accordance with an aspect of the present disclosure.

As illustrated in FIGS. 7A and 7B, when the local TC receives the TSTC reply message from the master TC, the local TC then has received all of the timestamp information (e.g., TS1, TS2, TS3, and TS4) that is needed for synchronizing the time with the master TC. As a result, the local TC computes, based on the received timestamps, a difference between the local ToNE and the master ToNE, e.g., DiffLocalToNE, and updates the local time information (e.g., local ToNE) based on the difference, thereby correcting the local clock information and achieving very accurate timing synchronization between the local TC and the master TC.

It is noted that aspects of the present technology described herein differs, among many other things, from certain methodologies described in IEEE1588. For example, in an aspect of the present disclosure, timestamp information of an incoming timing packet is added to each synchronization message, an outgoing timing packet is also timestamped, and the resident time is calculated based on the current timestamp; the timestamp is also included inside the received timing packet. That is, a synchronization reply message received at the local TC is configured to include all four timestamps, e.g., TS1, TS2, TS3, and TS4, which are used for performing an offset correction at the local TC.

As a result, in an aspect of the present disclosure, by replacing traditional transceivers with smart transceivers in an existing network element, a transparent clock function may be added to the network element, which would not otherwise be able to support the transparent clock function without additional hardware and/or software updates. Thus, the present technology and methodology may result in numerous benefits including great savings in upgrading currently deployed network elements in numerous telecommunications networks.

Further, it is noted that, although in the example herein a description of how a transparent clock function is added to the existing network element using smart transceivers is provided, other new system functions such as Sync-E capability may be added to the existing network element using the smart transceivers, in a manner similar to that described above in connection with the transparent clock function. In such a case of adding Sync-E capability, in accordance with an aspect of the present disclosure, the existing network element may be equipped with a common frequency source to distribute a frequency to some or all Ethernet ports of the existing network element.

It is noted that in example implementations described herein, the network element may be required to distribute all outgoing physical layer signals (e.g., Ethernet physical layer signals) based on the element's own common clock or frequency (e.g., f1). Thus, each smart transceiver coupled to the network element is able to extract the common clock or the frequency f1 of the network element from its Ethernet output signals transmitted to the smart transceiver. That is, in this manner, the smart transceivers coupled to the network element are able to obtain the same frequency f1.

In the example of adding the transparent clock to the existing network element, all the smart transceivers with transparent clock functions thus are able to have the same frequency. As such, in the implementation of the example proprietary protocol with timestamps T1, T2, T3, and T4, only the common phase and/or time needs to be determined, and use of a phase lock loop (PLL) is not required in the implementation. Instead, in the example implementation, a common phase and/or time needs to be established, via phase and/or time alignment, among the smart transceivers coupled to the network element.

Figure 8A:
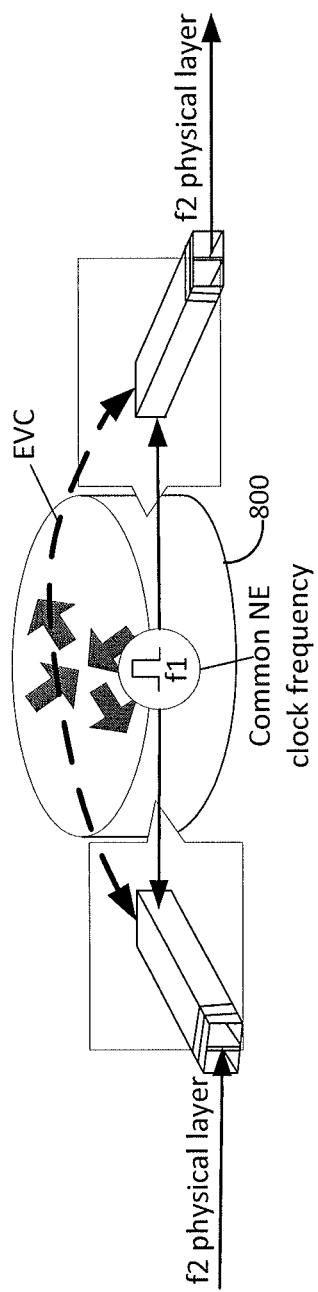
FIGS. 8A-8C are diagrams representatively illustrating example embodiments in accordance with various aspects of the present disclosure.
Figure 8B:
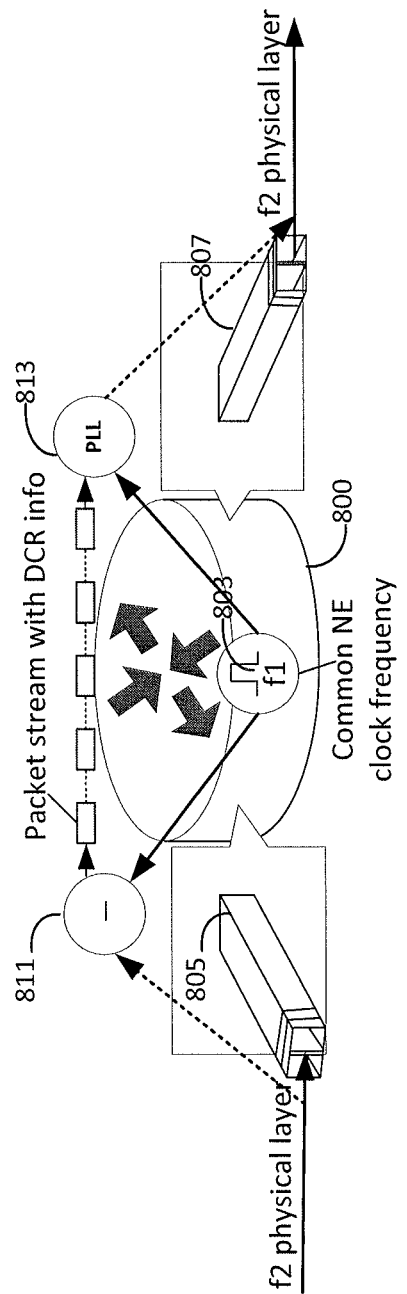
Figure 8C:
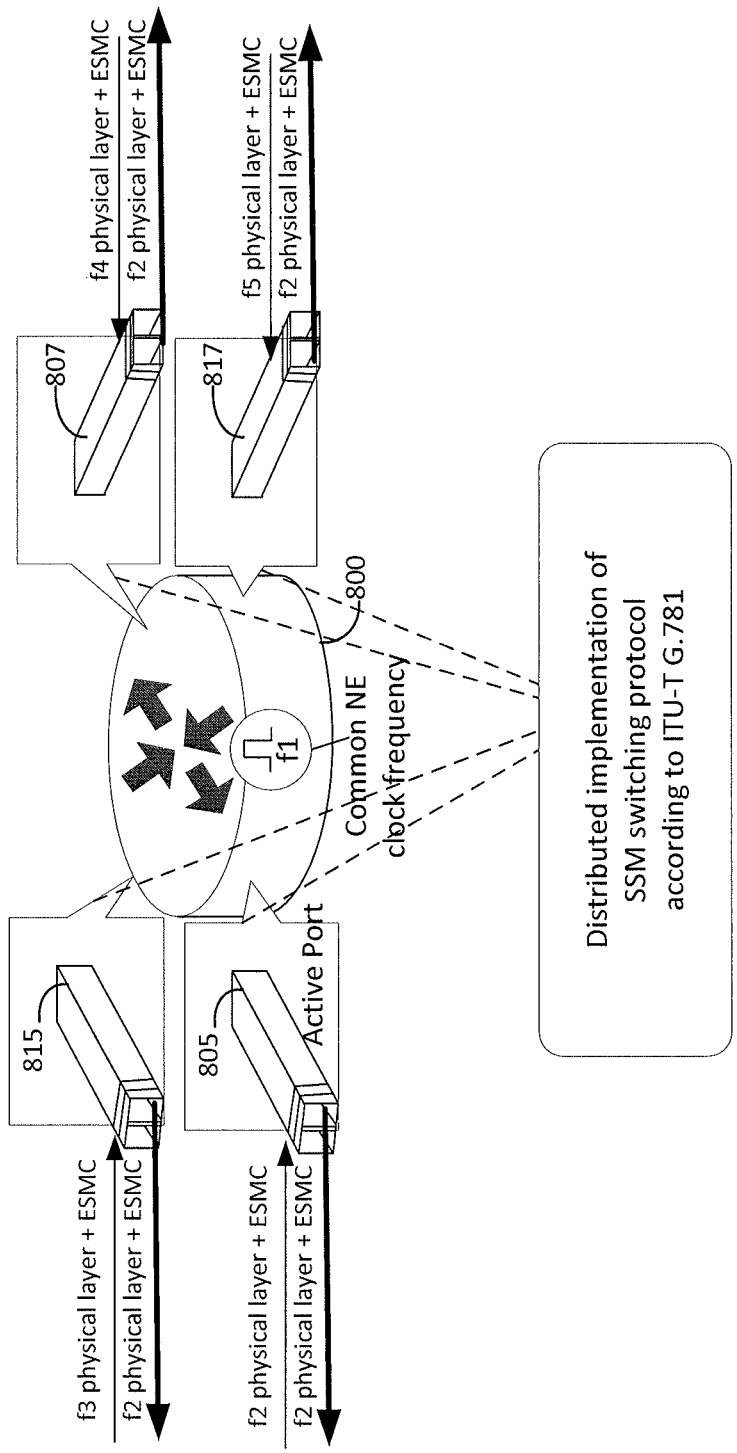

It is also noted that in an example implementation involving adding Sync-E to the existing network element, as shown in FIGS. 8A-8C and described herein, a clock frequency of incoming optical Ethernet signals (e.g., f2-f5 as shown in FIGS. 8A-8C) may be measured against a common clock f1, and the result may be transmitted, via use of a proprietary packet, for example, inside a discovery packet, to other smart transceivers with Sync-E capability. In this example, one or more differences between the common clock (e.g., f1) and other clock frequencies (e.g., f2, f3, f4, and f5) may be determined in a similar manner to that for synchronous residual time stamp (SRTS) or differential clock recovery (DCR) technology. Based on the received packet information and the common clock f1, other smart transceivers may produce the same frequency (one out of f2, F3, f4, and f5—for example, f2 in the example shown in FIG. 8C) at their optical outputs.

Furthermore, as noted above and shown in FIG. 8A, the existing network element 800 may be configured to include a dedicated data path among various ports (e.g., Ethernet output ports) of the existing network element 800, including an Ethernet virtual connection (EVC) 801 between the ports of the existing network element 800. The existing network element 800 may be configured to, via the Ethernet output ports, for example, couple to the smart transceivers 805 and 807. Further, the existing network element 800 may be configured to provide a common frequency f1 with respect to some or all the Ethernet output ports. Alternatively, the dedicated data path may also include a virtual local area network (VLAN) or multiprotocol label switching (MPLS) tunnel established among all ports of the existing network element.

Referring back to FIG. 8B, Sync-E may be added, for example, to the existing network element 800 by using smart transceivers 805 (or an interface A) and 807 (or an interface B), as follows. As noted, the network element 800 may provide a common frequency f1 (or a network element clock frequency) to all the ports of the network element 800. The smart transceiver 805 may be configured to obtain the common frequency f1 from the network element 800, as well as to receive a clock frequency f2 from another device in a network. At 811, the smart transceiver 805 (the interface A) determines a difference between the common frequency f1 and the received clock frequency f2, adds the determined difference to a packet with differential clock recovery (DCR) information, and transmits the packet to the smart transceiver 807 (the interface B). Thus, at the interface A, the frequency and/or phase difference between the frequencies f1 and f2 is measured and added to a dedicated packet to be transmitted to the interface B. At 813, the smart transceiver 807 receives the packet from the smart transceiver 805, obtains the common frequency f1 from the network element, and regenerates the clock frequency f2 for outputting to other devices, based on the common frequency f1 and a phase lock loop (PLL) function. Thus, at interface B, the packet information is used, and along with the common frequency f1, the original frequency and phase of f2 is recovered for transmission to other devices.

Further, FIG. 8C illustrates an example of a distributed implementation of synchronization status message (SSM) switching protocol using a plurality of smart transceivers. The smart transceivers 805, 807, 815, and 817 are coupled to the network element 800 via a plurality of interface ports of the network element 800, and the SSM switching protocol is implemented in accordance with ITU-T G.781, which is incorporated by reference herein in its entirety. In this example, one interface port may be selected as an active timing reference (or an active port) based on priority and/or SSM. Further, the port with the smart transceiver 805 may be determined to be the active port, and this port may transmit the frequency f2 as the reference frequency to the plurality of devices coupled to the network element 800. By way of example, the smart transceivers 807, 815, and 817 may be configured to receive the frequency f3, f4, and f5, respectively, and in accordance with an aspect of the present disclosure, some or all the other ports may transmit the SSM value and a frequency synchronized to the frequency f2 of the active port, according to the specification ITU-T G.781 and various aspects of the present disclosure.

It is noted that although the present disclosure illustrates example embodiments with respect to smart SFP modules, the present disclosure is not limited thereto, and it will be apparent that the present technology described herein may be similarly applied to various types of technologies including SFP+, XFP, X2, XENPAK, or the like.

Various aspects of the present disclosure may also be implemented by one or more processing systems. For example, the smart transceiver 121 (or 131), or its components such as the discovery unit 227 (or 237) and the new system function 229 (or 239), a system or network element 100, or its components such as the switching function unit 105 and the main system function unit 103, as shown in FIGS. 1 and 2 may be implemented with a bus architecture, which may include a bus and any suitable number of interconnecting buses and bridges, as shown in FIG. 9.

Figure 9:
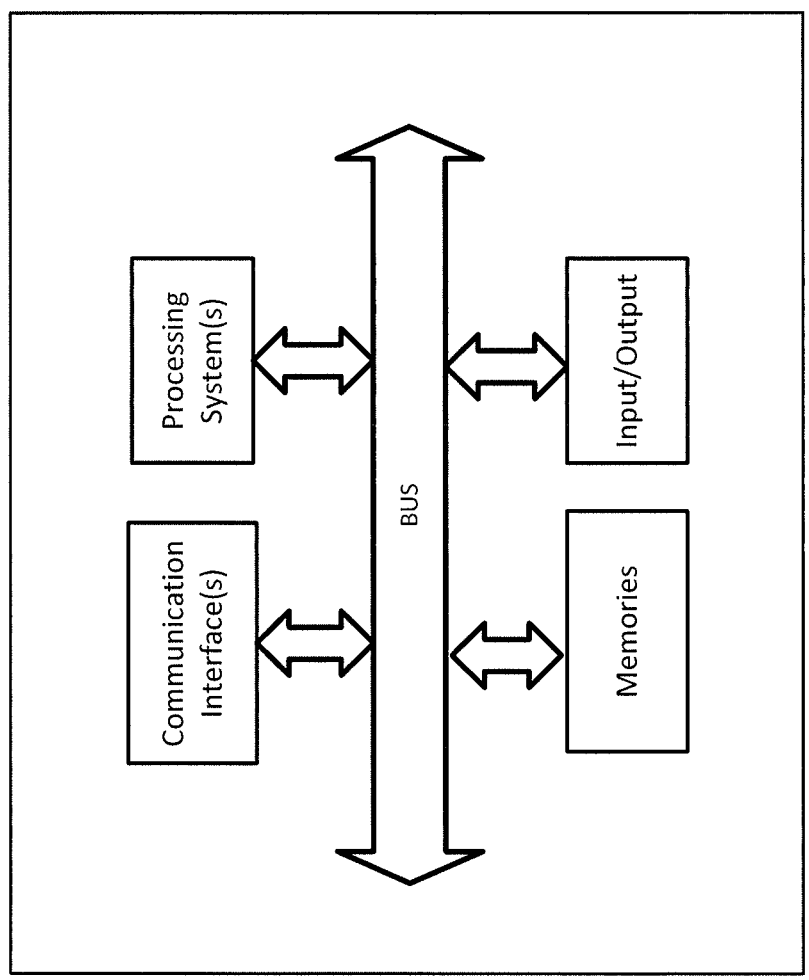
FIG. 9 is a diagram representatively illustrating an example embodiment in accordance with an aspect of the present disclosure.

As shown in FIG. 9, the bus may link together various circuits, including one or more processing systems (or processors), one or more memories, one or more communication interfaces, and/or one or more input/output devices. The one or more processing systems may be responsible for managing the bus and general processing, including the execution of software stored on a non-transitory computer-readable medium. As noted, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems, including optical transceivers (e.g., TOSA and/or ROSA). The one or more input/output devices may include devices that permit inputting information and/or outputting information to an operator.

The term "small form-factor (SFP)" or "SFP module" as used herein refers to a specification for optical modular transceivers, which are designed for use with small form factor connectors and may be hot-swappable devices. The SFP modules may be multi-source agreement (MSA) compliant and allow for optical and/or electrical interfaces, converting the electrical signals to optical signals, vice versa, and may be available for use with a variety of media, such as copper media, optical fiber (e.g., multimode optical fiber, or single mode optical fiber), etc. Generally, an existing SFP module may be used to plug into a port of a network switch and connect to a fiber channel and gigabit Ethernet (GbE) optical fiber cables at the another location thereon. Thus, the existing SFP module may enable the same electrical port on the network switch to connect to different types of optical fibers, including multi-mode or single-mode fibers.

The term "smart transceivers" as used herein may also be referred to as "intelligent transceivers," "smart SFPs," or the like. A smart transceiver combines an optical interface with various system functions in a standard SFP format, which may typically be implemented separately in existing SFP modules (e.g., on a service card in switching equipment or in a small equipment box), and may provide low power with no additional rack space requirement. Smart transceivers may be designed to deliver savings on operational and capital expenditures, such as by combing low power and no rack space requirements.

Compared to related art SFP modules, which are configured to only support optical to electrical or electrical to optical conversion, the smart SFP module as described herein may support and implement various functions within the smart SFP module, relating to a variety of protocols, such as Ethernet, PON, optical transport network (OTN), CPRI, SDI, video, and others. The smart transceivers thus may provide some or all of the traditional benefits of related art devices, but also provide additional and enhanced capabilities, such as, among others, protocol conversion, packet processing, traffic monitoring, encapsulation, protocol translations, circuit emulation for time division multiplexing (TDM) over packet, video conversion, forward error correction (FEC), functions relating to operation and maintenance of the smart transceivers, and/or other functions that may be implemented in the smart transceivers. For such implementation of additional and enhanced capabilities and functionalities, a smart transceiver may include, but not be limited to, one or more application specific integrated circuits (ASICs), field programmable gate arrays (FPGAs), processors, gate arrays, programmable logic, or the like. Also, the smart transceiver may include one or more memory or storage units for storing various configuration and/or parameters. As a result, a rich set of enhanced functionalities, including various service assurance and monitoring functions, such as operations administration, and maintenance (OAM) functions may be implemented in the smart transceiver.

By using smart transceivers, such as smart SFP modules, operators may also reduce costs in access and edge networks, since the operators thereby no longer need to install an equipment box or reserve rack space to add those enhanced functionalities and/or establish a demarcation or monitoring function. The smart SFP modules may be plug-and-play type and hot-swappable components, and thus may be used to replace the existing SFP modules in a network switch or a router. Further, the smart SFP modules may be configured to support digital diagnostic monitoring (DDM) functions and/or provide end users with the ability to monitor parameters of the smart SFP module, such as monitoring optical input and output power, internal temperature, laser bias current, transceiver supply voltage, and so forth.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), field programmable gate arrays (FPGAs), and other suitable hardware configured to perform various functions described herein. The term "software" used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

Also, the term "software" used herein includes various types of machine instructions including instructions, code, programs, subprograms, software modules, applications, software packages, routines, subroutines, executables, procedures, functions, etc. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a particular application within design constraints.

The term "unit" used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combinations thereof. The unit thus may include software components, task components, processes, procedures, functions, program code, firmware, micro-codes, circuits, data structures, tables, arrays, and variables.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein. Furthermore, the methodologies disclosed herein and throughout this specification are capable of being stored on an article of manufacture to facilitate transporting and transferring such methodologies to one or more processing systems. The term "article of manufacture" as used herein is intended to encompass a computer program accessible from any computer-readable device, carrier, or medium.

The terms "first," "second," and so forth used herein may be used to describe various components, but the components are not limited by the above terms. The above terms are used only to discriminate one component from the other component. For example, without departing from the scope of the present disclosure, a second component may be referred to as a first component, and the first component may be referred to as the second component in a similar manner. Also, the term "and/or" used herein includes a combination of a plurality of associated items or any item of the plurality of associated items.

Further, it is to be noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" used herein indicates that a feature, an operation, a component, a step, a number, a part or any combination thereof described herein is present. However, the term "include" or "have" does not exclude a possibility of presence or addition of one or more other features, operations, components, steps, numbers, parts or combinations. Also, as used herein, the article "a" is intended to include one or more items. Further, no element, act, step, or instruction used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An apparatus for data communication, comprising:
a switching unit;
a plurality of interfaces coupled to the switching unit; and
a plurality of smart transceivers coupled to the plurality of interfaces,
wherein each of the plurality of smart transceivers comprises a discovery unit and a new system function unit, the discovery unit being configured to discover other smart transceivers coupled to the plurality of interfaces, and the new system function unit being configured to add one or more new functionalities to the apparatus;
wherein the discovery unit is further configured to:
transmit a multi-cast discovery message including a destination medium access control (MAC) address and an operating state of the smart transceiver originating the multi-cast discovery message; and
receive, in response to the multi-cast discovery message, a unicast reply message from each smart transceiver coupled to the plurality of interfaces, the unicast reply message being configured to include a source MAC address and an operating state of the smart transceiver replying to the multi-cast discovery message.

2. The apparatus of claim 1, further comprising a virtual connection established among the plurality of smart transceivers coupled to the plurality of interfaces, and configured to provide one or more communication paths among the plurality of smart transceivers.

3. The apparatus of claim 2, wherein the virtual connection comprises at least one of: an Ethernet virtual connection (EVC), a virtual local area network (VLAN), a multiprotocol label switching (MPLS) tunnel or an Ethernet connection.

4. The apparatus of claim 3, wherein the switching unit is further configured to have a single frequency that transmits all physical layer signals, the switching unit being without capability of supporting Sync-E or IEEE1588.

5. The apparatus of claim 4, wherein the switching unit is further configured to provide, via the plurality of smart transceivers, Sync-E functionality among the plurality of smart transceivers coupled to the switching unit that does not include capability of supporting Sync-E functionality.

6. The apparatus of claim 1, wherein each of the smart transceivers comprises an optical transceiver including at least one selected from a group consisting of: a field programmable gate array (FPGA), a micro-controller, and a microprocessor.

7. The apparatus of claim 6, wherein each of the smart transceivers comprises at least one of: a smart small form-factor pluggable (SFP) module, SFP+ module, XFP module, X2 module, or XENPAK module.

8. The apparatus of claim 1, wherein the multi-cast discovery message further includes up time information of a smart transceiver originating the multi-cast discovery message.

9. The apparatus of claim 1, wherein the discovery unit is further configured to build a database of information regarding the smart transceivers coupled to the plurality of interfaces.

10. The apparatus of claim 9, wherein the discovery unit is further configured to determine a master unit among the discovered smart transceivers based on a plurality of MAC addresses of the discovered smart transceivers coupled to the plurality of interfaces.

11. The apparatus of claim 1, wherein the new system function unit is configured to establish local time-of-day (ToD) synchronization among the plurality of smart transceivers or add Synchronous Ethernet (Sync-E) to the switching unit that does not support Sync-E.

12. The apparatus of claim 11, wherein the new system function unit is further configured to transmit a ToD synchronization message as an initiating smart transceiver, and in response to the ToD synchronization message, receive a reply message including one or more timestamps from one or more other smart transceivers coupled to the plurality of interfaces.

13. The apparatus of claim 12, wherein the one or more timestamps comprise a first transmit timestamp at the initiating smart transceiver, a second receive timestamp at a master smart transceiver, a third transmit timestamp at the master smart transceiver, and a fourth receive timestamp at the initiating smart transceiver.

14. The apparatus of claim 12, wherein the new system function unit is further configured to transmit a plurality of ToD synchronization messages per second.

15. The apparatus of claim 1, wherein the switching device comprises a network switch or a router.

16. The apparatus of claim 1, wherein the new system function unit is further configured to add a new system function that is to be implemented via sharing of information among the plurality of smart transceivers, and wherein the switching unit is not capable of supporting or implementing the new system function by itself.

17. An optical transceiver usable in a switching device for data communication with other optical transceivers coupled to the switching device, the optical transceiver comprising:
a transmitter optical subassembly for receiving an electrical signal and converting the received electrical signal into an optical signal;
a receiver optical subassembly for receiving an optical signal and converting the received optical signal into an electrical signal; and
logic configured to:
perform monitoring and control functions of the transmitter optical subassembly and the receiver optical subassembly;
discover the other optical transceivers coupled to a plurality of interfaces of the switching device, based on an exchange of discovery protocol messages; and
add a new functionality to the switching device based on one or more messages between the optical transceiver and the other optical transceivers;
wherein the discovery protocol messages include:
a multi-cast discovery message including a destination medium access control (MAC) address and an operating state of the smart transceiver originating the multi-cast discovery message from the optical transceiver to the other optical transceivers coupled to the plurality of interfaces of the switching device; and
a unicast reply message, responsive to the multi-cast discovery message, from the other optical transceivers to the optical transceiver, the unicast reply message being configured to include a source MAC address and an operating state of an optical transceiver replying to the multi-cast discovery message.

18. The optical transceiver of claim 17, wherein the optical transceiver comprises at least one of: a smart small form-factor pluggable (SFP) module, SFP+ module, XFP module, X2 module, or XENPAK module.

19. The optical transceiver of claim 17, wherein the logic comprises at least one selected from a group consisting of: a field programmable gate array (FPGA), a microcontroller, and a microprocessor.

20. The optical transceiver of claim 17, wherein the new functionality comprises local time-of-day (ToD) synchronization or Synchronous Ethernet (Sync-E), and wherein the switching device does not support the local ToD synchronization and Sync-E.

21. The optical transceiver of claim 17, wherein the new functionality comprises a new system function that is to be implemented via sharing of information among the plurality of smart transceivers, and wherein the switching device is not capable of supporting or implementing the new system function by itself.

22. The optical transceiver of claim 17, wherein the logic is further configured to build a database of information regarding the optical transceivers coupled to a plurality of interfaces of the switching device.

23. The optical transceiver of claim 17, wherein the discovery protocol messages are exchanged via a virtual connection including an Ethernet virtual connection (EVC), a virtual local area network (VLAN), a multiprotocol label switching (MPLS) tunnel or an Ethernet connection, established between the optical transceiver and the other optical transceivers coupled to the switching device.

* * * * *